(12) United States Patent
Kumar et al.

(10) Patent No.: US 8,621,447 B1
(45) Date of Patent: Dec. 31, 2013

(54) SYSTEMS AND METHODS FOR DYNAMIC STRUCT VARIABLE CREATION INCLUDING INLINE DECLARATION WITH DYNAMIC KEYS

(75) Inventors: Chandan Kumar, Karnataka (IN); Sanjeev Kumar, Karnataka (IN)

(73) Assignee: Adobe Systems Incorporated, San Jose, CA (US)

( * ) Notice: Subject to any disclaimer, the term of this patent is extended or adjusted under 35 U.S.C. 154(b) by 1028 days.

(21) Appl. No.: 12/546,891

(22) Filed: Aug. 25, 2009

(51) Int. Cl.
*G06F 9/45* (2006.01)

(52) U.S. Cl.
USPC ............ 717/153; 717/106; 717/143; 717/146

(58) Field of Classification Search
None
See application file for complete search history.

(56) References Cited

U.S. PATENT DOCUMENTS

| | | | | |
|---|---|---|---|---|
| 5,848,274 A * | 12/1998 | Hamby et al. | ................ | 717/153 |
| 5,933,642 A * | 8/1999 | Greenbaum et al. | ........... | 717/140 |
| 6,223,340 B1 * | 4/2001 | Detlefs | .......... | 717/145 |
| 6,434,742 B1 * | 8/2002 | Koepele, Jr. | .................. | 717/140 |
| 7,433,863 B2 * | 10/2008 | Zane et al. | ............. | 1/1 |
| 7,454,429 B2 * | 11/2008 | Rojer | ..................... | 1/1 |
| 7,493,604 B2 * | 2/2009 | Mariani | ........................ | 717/148 |
| 7,899,861 B2 * | 3/2011 | Feblowitz et al. | ............ | 709/201 |
| 8,239,848 B2 * | 8/2012 | Ghercioiu et al. | ............ | 717/162 |
| 8,365,156 B2 * | 1/2013 | Sollich | .......................... | 717/146 |
| 2005/0182752 A1 * | 8/2005 | Rojer | .............................. | 707/2 |
| 2007/0055964 A1 * | 3/2007 | Mirkazemi et al. | ........... | 717/140 |
| 2008/0228697 A1 * | 9/2008 | Adya et al. | ........................ | 707/2 |
| 2008/0250390 A1 * | 10/2008 | Feblowitz et al. | ............. | 717/114 |
| 2009/0077014 A1 * | 3/2009 | Zachariah | .......................... | 707/2 |
| 2009/0293045 A1 * | 11/2009 | Cheriton | ........................ | 717/136 |
| 2010/0088666 A1 * | 4/2010 | Box et al. | ....................... | 717/104 |
| 2010/0192129 A1 * | 7/2010 | Langworthy et al. | ......... | 717/126 |
| 2010/0275189 A1 * | 10/2010 | Cooke et al. | ................... | 717/146 |
| 2011/0131548 A1 * | 6/2011 | Colton et al. | ................... | 717/106 |
| 2011/0314444 A1 * | 12/2011 | Zhang et al. | ................... | 717/106 |
| 2012/0136806 A1 * | 5/2012 | Anderson et al. | ............ | 705/36 R |
| 2012/0192149 A1 * | 7/2012 | Adi et al. | ........................ | 717/108 |

OTHER PUBLICATIONS

Title: Array Mapping: Optimal Transformation Matrix Design, author: Per Hyberg et al, source: IEEE, dated: 2002.*
Title: Array Mapping in Behavioral Synthesis, author: Herman Schmit et al, source: IEEE, dated:1995.*

* cited by examiner

*Primary Examiner* — Chameli Das
(74) *Attorney, Agent, or Firm* — Kilpatrick Townsend & Stockton LLP

(57) ABSTRACT

A parser can be configured to parse source code to generate code for dynamically generating structures at runtime. Any or all of the structure name, keys, and values can be defined dynamically (i.e. at runtime), rather than requiring declaration in the source code. Embodiments include a method in which a source file is parsed to identify an expression creating a dynamic structure with at least one key-value pair. The method can comprise generating a plurality of expressions for creating intermediate data structures which, at runtime, can cause the dynamic structure to be defined as set forth in the declarative expression. The dynamic structure may comprise one or more declared key-value pairs and/or may comprise one or more key-value pairs that are also dynamic.

20 Claims, 4 Drawing Sheets

SYSTEMS AND METHODS FOR DYNAMIC STRUCT VARIABLE CREATION INCLUDING INLINE DECLARATION WITH DYNAMIC KEYS

TECHNICAL FIELD

The disclosure below generally relates to application development, particularly to coding and compiling techniques.

BACKGROUND

Source code comprises a series of declarative expressions used to configure a computing device to function. For example, source code can be compiled into executable code that actually directs the operations of a computing device. As another example, source code can be interpreted into an intermediate representation (e.g., bytecode) that directs the operations of the computing device.

Declarative expressions can be used in web scripts or other source code to generate bytecode or executable code that allows for variable names to be dynamically defined at runtime along with values for the variables. For example, an expression in a code generation file for an application server may be parsed by the application server to generate byte code which analyzes a series of parameters contained in a URL invoking use of the code generation file. The byte code can reference a data structure ("struct") during operation, and so an expression for setting up the data structure can be included in the code generation file.

The expression may define a number of key-value pairs to be included in a struct based on the contents of some runtime expressions. An example can be to use various scopes as part of runtime expressions including the URL. Then, certain URL parameters may be matched to keys and other parameters matched to respective values associated with the keys by other code. However, a developer may be limited in use of the strict—for example, the developer may be able to write code to set values dynamically but may be required to define the keys and/or structure name in the source code. This may be problematic—for instance, the URL cannot always be guaranteed to use the same mapping for variable names and values.

SUMMARY

In accordance with one or more aspects of the present subject matter, a parser can be configured to parse source code to generate code for dynamically generating structures at runtime. Any or all of the structure name, keys, and values can be defined dynamically (i.e. at runtime), rather than requiring declaration in the source code.

Embodiments include a method in which a source file is parsed to identify an expression creating a dynamic structure with at least one key-value pair. The method can comprise generating a plurality of expressions for creating intermediate data structures which, at runtime, can cause the dynamic structure to be defined as set forth in the declarative expression. The dynamic structure may comprise one or more declared key-value pairs and/or may comprise one or more key-value pairs that are also dynamic.

Embodiments also include systems and computer-readable media comprising code for recognizing declarations of a dynamic structure and preparing appropriate code for implementing the dynamic structure via intermediate data structures. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
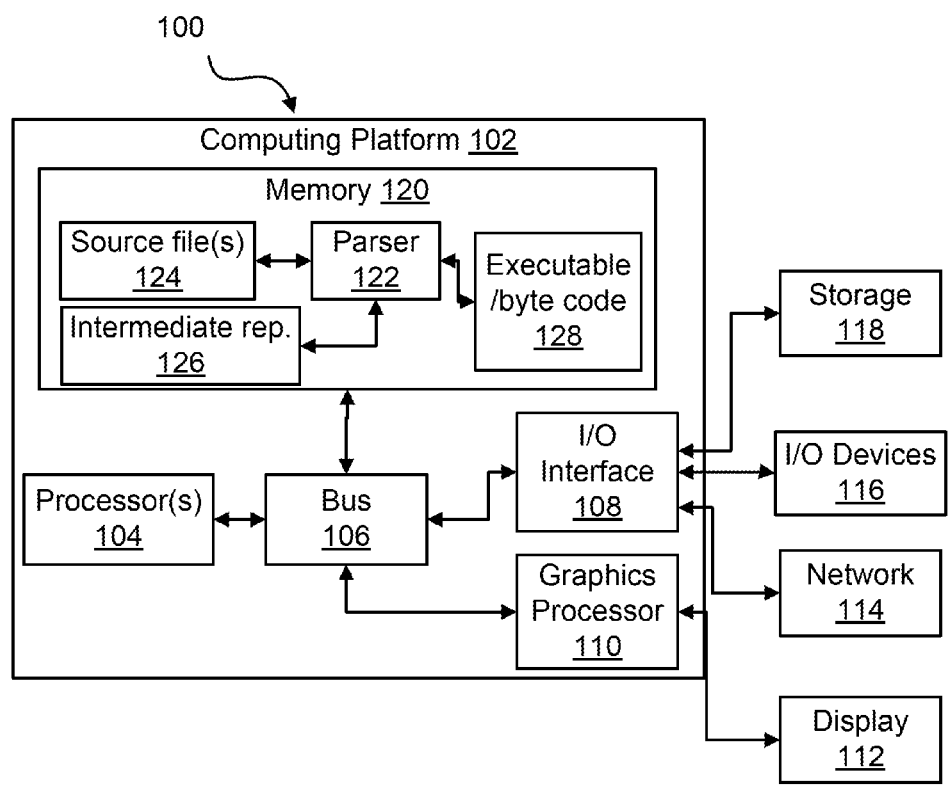
FIG. 1 is a block diagram illustrating an exemplary computing system suitable for use in implementing one or more embodiments of the present subject matter.

FIG. 1 is a block diagram illustrating an exemplary computing system 100 suitable for use in implementing one or more embodiments of the present subject matter. In this example, computing system 100 includes a computing device 102 comprising one or more processors 104, a bus 106, memory 120, input-output (I/O) handling components 108, a display 112, user input (UI) devices 116 (e.g., a mouse, keyboard, touch screen interface, etc.), one or more networking or other interfaces 114 (e.g., Ethernet, USB, etc.), and storage 118 (e.g., hard disk, optical drive(s)). Memory 120 represents one or more computer-readable media accessible by processor(s) 104 and can embody one or more program components that configure the operation of the computing system.

In this example, the program components comprise a parser 122 configured in accordance with the present subject matter. Parser 122 accesses one or more source code files 124 comprising declarative expressions and uses the syntax of those files to generate executable and/or byte code 128. Parser 122 may, for example, be included in a compiler or other application used to generate executable code or bytecode 128 for use in configuring other operations of computing system 102. Executable code/bytecode 128 may represent components resident in memory but is not directly output to a user. For example, an application server may use parser 122 to generate bytecode 128, which is used to set up variables and methods used generating dynamic web pages that are output to a user.

As another example, parser 122 may be included in an integrated development environment (IDE) and can be used to parse source code and generate executable code 128 intended for execution at computing system 102 and/or elsewhere. The output of parser 122 may be viewed or used by a user in such embodiments.

The general configuration of parsers/compilers should be known to one of skill in the art and is therefore not discussed in detail herein. Generally, parser 122 can recognize expressions provided using a known syntax and then generate suitable program components for providing functionality associated with the known syntax. As an example, expressions may be mapped to particular sequences of machine instructions that implement the functionality and the sequences of machine instructions can be put together in a way that yields a functional component.

In accordance with one or more aspects of the present subject matter, parser 122 can be configured to recognize source code declarations in which one or more dynamic structures are declared. In response to the declaration of a dynamic structure, parser 122 can generate intermediate representations 126 that can be used to generate executable or byte code 128 configured so that, at runtime, the dynamic structure is properly assembled. In this example, parser 122 relies on the intermediate representations 126, but embodiments can include those in which another component consumes the intermediate representations to generate executable code/bytecode 128.

Figure 2:
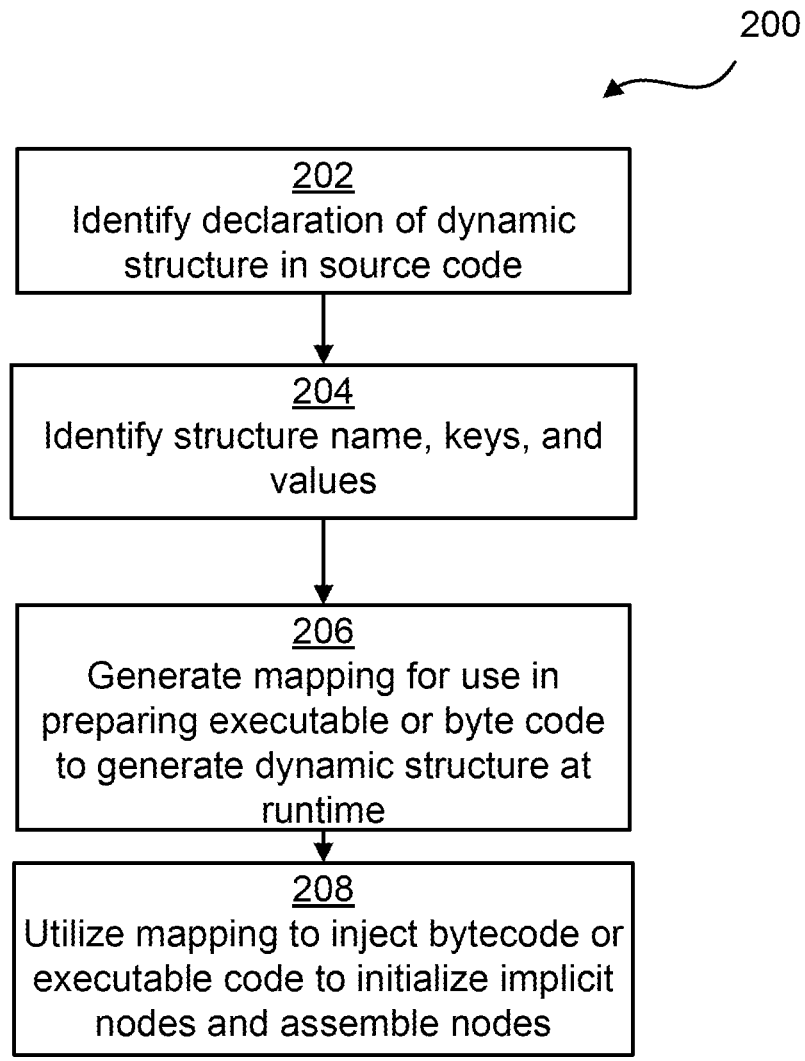
FIG. 2 is a flowchart showing steps in an exemplary method for providing executable code or bytecode in response to a declaration of a dynamic structure.

FIG. 2 is a flowchart showing steps in an exemplary method 200 for providing executable code or bytecode in response to a declaration of a dynamic structure. Block 202 represents identifying declaration of a dynamic structure in source code. For example, a parser can be configured to recognize an expression creating a structure, such as a syntax in which a variable is named and assigned one or more key-value pairs in the code snipped below:

name={key1=value1,key2=value2, . . . key*n*=value*n*}

One or more of the structure's name, keys, or values may be indicated as dynamic (i.e., set at runtime) by suitable syntax. For instance, the parser may recognize use of one or more characters as setting a dynamic value, such as the "#" character surrounding the value name Thus, the expression below could be recognized as declaring a dynamic structure with a dynamic name:

"#name#"={key1=value1,key2=value2}

As another example, the expression below could be recognized as declaring a dynamic structure with a name expressed, but with dynamic key-value pairs:

company={#key1#=#value1#,key2#=#value2#}

As a further example, the expression below could be recognized as declaring a dynamic structure in which all components are dynamic and the only declared characteristic is the number of key-value pairs:

"#name#"={#key1#=#value1#,#key2#=#value2#, #key3#=#value3#}

Still further, runtime expression such as a function call may be part of the key or value as declared in source code:

"#functionVariablecall( )#"=
    {#functionKeycall( )#=#functionValuecall( )#}

At block 204, the structure name, keys, and values are identified. For example, by parsing the statements above, the structure name can be identified based on what characters are to the left of the "=" symbol in the initial assignment. The key=value pairs are separated by commas and the keys and values are spaced by an equal sign in each assignment. It will be understood that the present syntax is for purposes of example only and any syntax could be used in embodiments of the present subject matter.

Figure 4:
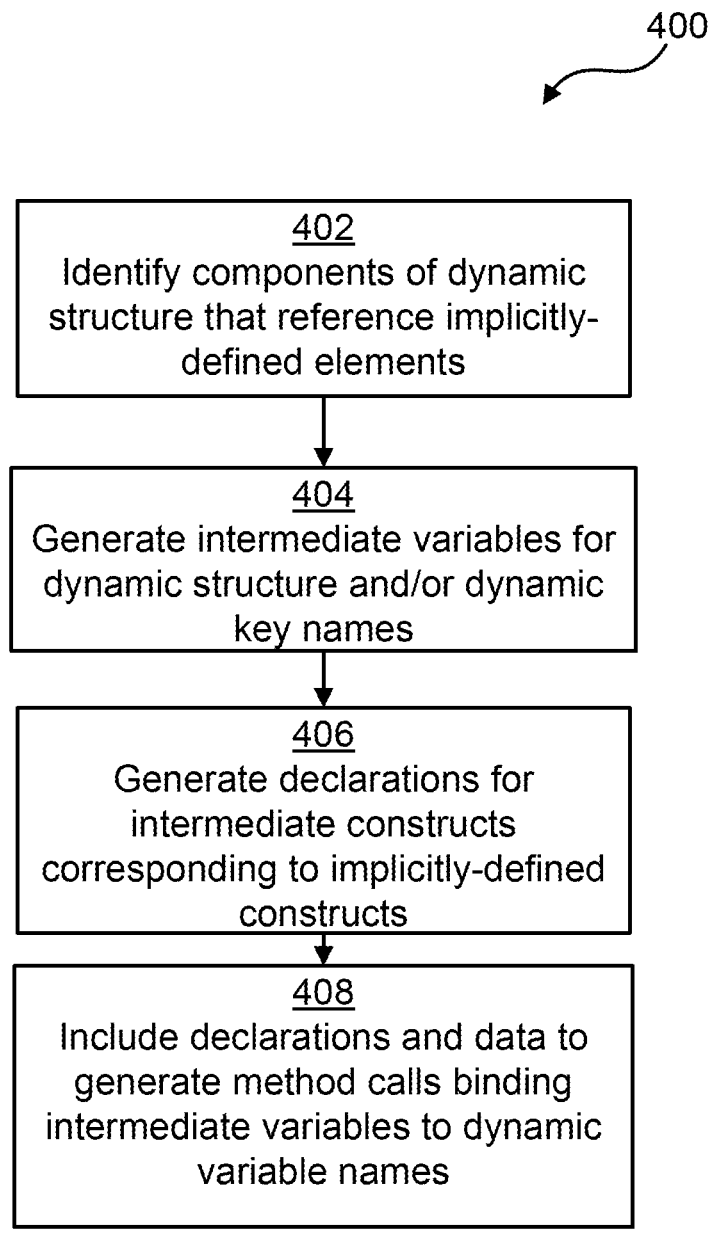
FIG. 4 is a flowchart showing steps in an exemplary method 400 for generating a mapping for use in assembling a dynamic structure at runtime.

At block 206, a mapping is generated for use in generating code operative to assemble the dynamic structure at runtime, with the mapping generated based on analyzing the structure and its assignments. An example of such analysis is provided further below in conjunction with FIG. 4. The mapping may, for example, correspond to intermediate representations 126 of FIG. 1 and can be used to overcome limitations which previously precluded use of dynamic structures.

Generally, an inline dynamic structure has been considered as a plain variable declaration. When a variable is declared in source code, the resulting executable code or byte code acts to allocate a memory space for storing the value assigned to that variable and a memory space for the variable's name. The address of the variable's name is cross-referenced to the memory space for the value so that the name points to the value. For a structure (or array), the values for each key of the structure are offset from the address of the structure's name. In previous parsers, if the structure name and/or key names are unknown, the parser cannot prepare executable or bytecode since the pointers rely on the structure and key names.

In embodiments of the present subject matter, declaration of a structure with one or more dynamic values is treated as more like an assignment expression, which pushes variable creation to runtime so that the pseudo variables are bound as key-values at compile time. A parser can de-construct the dynamic structure declaration into a plurality of elements and maintain a mapping of the elements as an intermediate representation of the dynamic structure. Then, as indicated by block 208, the mapping can be used to inject suitable bytecode (or executable code) to initialize a series of implicit nodes and then assemble the nodes together into the final dynamic structure at runtime. The implicit nodes can correspond to the intermediate representations, and this process is illustrated in conjunction with the examples of FIGS. 3 and 4 below.

These executable/bytecode segments can be included alongside other code being prepared based on parsing the remainder of the source code, which can specify how values for the dynamic components should be determined. For instance, a dynamic structure declared in source code using #name# can include other code for resolving how to arrive at a value for #name# at runtime. Since the injected code ties the dynamic names to the chain of implicit nodes, the remainder of the source code can refer to the dynamic names, thus easing the coding process for developers.

Figure 3:
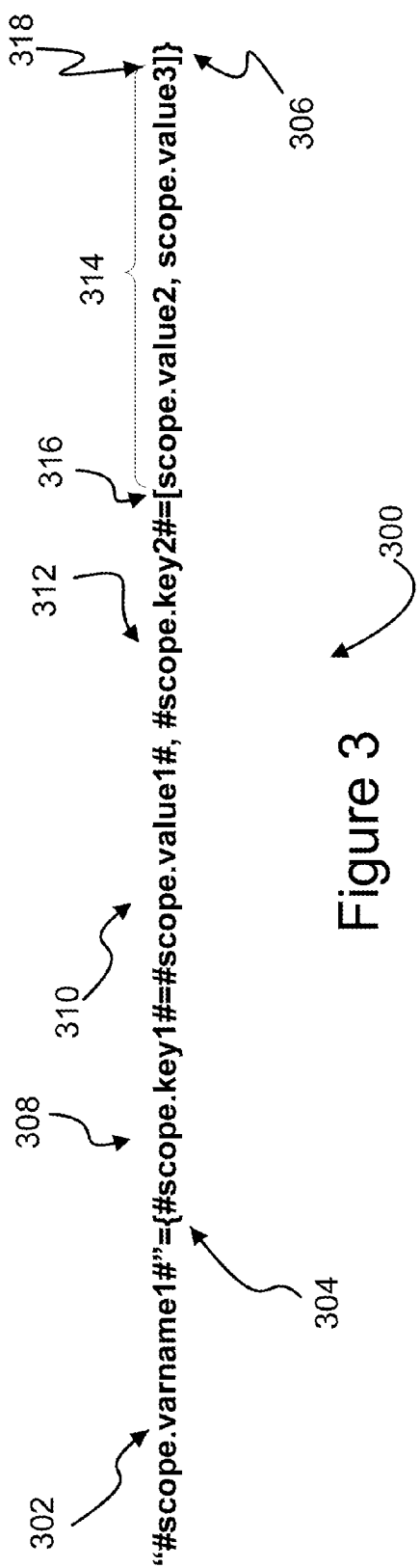
FIG. 3 is a diagram showing elements of an exemplary expression declaring a dynamic structure.

FIG. 3 is a diagram showing elements of an exemplary expression 300 declaring a dynamic structure. In this example, as shown at 302, a dynamic name #scope.varname1# is provided, with the dynamic nature of the structure indicated by the "#" characters. Brackets 304 and 306 denote the contents of the structure. In this example, the structure includes a dynamic key-value pair as shown at 308 and 310, at which a dynamic key 308 named #scope.key1# is assigned a (dynamic) value 310 #scope.value1#. The structure further includes another key-value pair as shown at 312 and 314.

Particularly, a key 312 with a dynamic name #scope.key2# is paired with an array 314 as indicated by square brackets 316 and 318. The array comprises two declared (non-dynamic) values scope.value2 and scope.value3.

Prior to runtime, there will be no variable in memory corresponding to the structure declared at 300. Instead, the variable can be declared using a series of expressions from a mapping produced by a parser that recognizes the elements of the dynamic structure. An example of generating such a mapping will be discussed in conjunction with expression 300 and the method illustrated by FIG. 4, which is a flowchart showing steps in an exemplary method 400 for generating a mapping for use in assembling a dynamic structure at runtime.

Block 402 represents identifying the components of the dynamic structure that reference one or more implicitly-defined elements. For instance, as was noted above, a parser can determine the name and key-value pairs based on the syntax of an expression. An implicit element refers to an expression in the declaration that either assumes the existence of another variable or another implicit element.

For instance in the implicit expression

"#scope.varname1#"={#scope.key1#=#scope.value1#, scope.key2=[scope.value2, scope.value3]} scope.key1# is the first element of the key-value pairs which is dynamic, #scope.value1# is the second element of the key-value pairs which is dynamic, and [scope.value2, scope.value3] is third element which is again an implicit array declaration although scope.value2 and scope.value3 themselves are declared. The structure name is also an implicitly-defined element.

Implicitly-defined elements can be defined based on syntax—for instance, any elements defined as dynamic (e.g., using "#" in this example) or referring to another construct (e.g., to an array, a structure) can be deemed implicitly-defined.

Block 404 represents generating intermediate variable names for dynamic structure names and/or key names. In this example, the dynamic structure's name assumes an implicit variable, so a variable dynVar can be created and its value can correspond to the dynamic structure's name—scope.varname. For dynamic key-value pairs, then variables corresponding to the dynamic key names could be declared as well. For instance, a dynamic variable dynVar2 can be created and named scope.key1 and a dynamic variable dynVar3 can be created and named scope.value1.

Block 406 represents generating a declaration for each implicitly defined construct, such as implicit structures included in the declaration of the dynamic structure. For instance, value 314 implicitly assumes the existence of an array containing scope.value2 and scope.value3. Key-value pair 308-310 assumes the existence of scope.key1 and scope.value1. For each implicit structure, an appropriate declaration can be generated to create an intermediate representation so that the references to the implicit structures in the dynamic structure declaration actually refer to a chain of validly-declared variables or constructs. This may include generating appropriate declarations so that the implicit structures are linked together (i.e., nested) properly and use the variables created for dynamic key-value pairs and names.

For example, a declaration for an array implarray1 containing scope.value2 and scope.value3 can be generated. Then, a declaration for a structure implstruct can be generated to create a structure having the same key-value pairs as the originally-declared dynamic structure in 300, but with the name of the new array in place of the implicitly declared array:

implstruct={dynVar2=dynVar3, scope.key2=implarray1}

Note that this expression also includes the intermediate variables dynVar2 and dynVar3 as well as the intermediate array implarray1.

Block 408 represents generating declarations and/or other data for method calls binding the declared intermediate variables to the dynamic variable names. For instance, variable dynVar can be bound to the root of implstruct so that implstruct is cross-referenced to dynVar's value as declared ("scope.varname"). Similarly, variables that were declared to correspond to dynamic key names can be bound to the dynamic key names.

As noted above, the intermediate expressions can result in bytecode that assembles the dynamic structure at runtime. In this example, the intermediate expressions could result in injection of bytecode for methods to create and populate the intermediate arrays and variables and then use the intermediate arrays and variables to assemble the dynamic structure. Particularly, the code can carry out the actions noted below For "#scope.varname1#"={#scope.key1#=#scope.value1#, scope.key2=[scope.value2,scope.value3]} the expression can be parsed and mapped to the following actions. This example uses ColdFusion(r) syntax, but the principles are applicable to other code parsers.

First, an implicit array variable is defined:

IMPLICITARRYSTRUCTVAR1=StructNew( );

Assignments as noted below are set up, and then the name for the dynamic structure is resolved:

resolve(scope.varname1)=IMPLICITARRYSTRUCT-VAR1

An example of the assignment setups is noted below:

```
__IMPLICITARRYSTRUCTVAR1.set(CFPage.StructNew( ));
_arraySetAt(__IMPLICITARRYSTRUCTVAR1, new Object[ ] {
    _resolveAndAutoscalarize(SCOPE, new String[ ] {
       "KEY 1"
    })
}, _resolveAndAutoscalarize(SCOPE, new String[ ] {
    "VALUE1"
}));
_structSetAt(__IMPLICITARRYSTRUCTVAR1, new String[ ] {
    "SCOPE", "KEY2"
}, ArrayNew(1));
CfJspPage._arraySetAt(_LhsResolve
   (__IMPLICITARRYSTRUCTVAR1, new String[ ] {
    "SCOPE", "KEY2"
}), new Object[ ] {
    "1"
}, _resolveAndAutoscalarize(SCOPE, new String[ ] {
    "VALUE2"
})),
CfJspPage._arraySetAt(_LhsResolve
   (__IMPLICITARRYSTRUCTVAR1, new String[ ] {
    "SCOPE", "KEY2"
}), new Object[ ] {
    "2",
}, _resolveAndAutoscalarize(SCOPE, new String[ ] {
    "VALUE3"
}));
_set(Cast._String(_resolveAndAutoscalarize(SCOPE, new String[ ] {
    "VARNAME1"
})), _get(__IMPLICITARRYSTRUCTVAR1));
```

Embodiments of the present subject matter may allow a variety of code authoring tasks to be implemented in a much easier manner. For example, a single line of code can be included in source code in order to set up a number of structures, such as declaring a corresponding structure for each item in a shopping cart as part of a loop. Each structure can include key-value pairs populated from a database.

For instance, they key-value pairs may correspond to the item's name, price, serial number, etc., each of which could be dynamically named. For instance, certain items may have a "serial number" while others have a "product number." Rather than being bound to the naming convention (or duplicating efforts by including a "serial number" key and a "product number" key), the dynamic structure can be declared with a set number of key-value pairs and appropriate code to map whichever of the serial number or product number is available to a key-value pair Consider, for example, a framework writer. The framework's utility may be inherently called on application setup to populate the metadata relevant with the current framework version. Since relevant metadata may change over different versions, this can require keys that are dynamic in the sense that different versions may include different metadata tags and associated values, with new tags needing new keys.

The framework writer could develop code that relies on populating a fixed variable with a fixed set of keys that are updated based on a "contract" with applications using the framework. However, embodiments of the present subject matter can be used to improve the development experience and/or functionality of the framework.

By using an embodiment, no contract with the application is needed to set up the keys. Instead, the code for the framework can be set up with dynamic keys to receive information from applications invoking the framework. The applications can simply send their own variable name (and scope) which they want it to be populated with. Some applications may want to keep that variable in user session while others in application/server/cluster etc. This reduces the contract dependency which makes it more pluggable (decoupled) application deployment.

Several of the examples above noted dynamic structures with numerous key-value pairs. The present subject matter may be used to parse source code declaring a dynamic structure with a single key-value pair or with no key-value pairs. For example, an expression "#scope.var1#"={ } can be supported whereby code is generated to resolve the structure name at runtime and initialize an empty structure for use by other program components.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result.

In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method, comprising:
   accessing source code from a non-transitory computer-readable medium, the source code comprising at least one declarative expression;
   identifying a declarative expression of a dynamic structure in source code by parsing the source code, the dynamic structure declared as having at least one of a name referencing a dynamic value or at least one key-value pair referencing a dynamic value;
   generating a mapping for use in generating output code, the output code configured to generate a structure at runtime based on the declaration of the dynamic structure, wherein the mapping comprises at least one intermediate expression corresponding to the dynamic value, and wherein the intermediate expression comprises:
     a declaration to initialize an intermediate component of the mapping, the intermediate component of the mapping comprising at least one of an array or a variable; and
     a declaration to initialize a structure having an intermediate array name in place of an array declared in the dynamic structure; and
   storing the mapping in the non-transitory computer-readable medium.

2. The method set forth in claim 1, wherein generating the mapping comprises:
   determining that the name of the dynamic structure references an implicit element; and
   including an intermediate expression in the mapping, the intermediate expression comprising an expression to initialize a variable and an intermediate expression binding the value of the variable to the name of the dynamic structure as declared.

3. The method set forth in claim 1, wherein generating the mapping comprises:
   determining that at least one value in a key-value pair of the dynamic structure references an array, the array having at least one array value; and
   including an intermediate expression in the mapping, the intermediate expression comprising a declaration to initialize the intermediate array having the intermediate array name and comprising the at least one array value.

4. The method set forth in claim 1, wherein generating the mapping comprises:
   determining that at least one key name in a key-value pair of the dynamic structure is a dynamic value;
   including an intermediate expression in the mapping, the intermediate expression comprising a declaration to initialize an intermediate variable having the key name as a value; and
   including an intermediate expression in the mapping comprising a declaration to initialize a structure having the intermediate variable in place of the at least one key name.

5. The method set forth in claim 1, wherein generating the mapping comprises:
   determining that at least one of a key name in a key-value pair, a value name in a key-value pair, or a name of the dynamic structure is a dynamic value comprising a function; and
   including an intermediate expression in the mapping comprising a declaration to call the function to resolve the name.

6. The method set forth in claim 1, further comprising:
   using the mapping to generate output code, the output code configured to cause a computing device to initialize a series of implicit nodes corresponding to the at least one intermediate expression and then assemble the nodes together into the dynamic structure at runtime.

7. The method set forth in claim 6, wherein the source code comprises a code generation file and the generated code comprises byte code for use by an application server.

8. The method set forth in claim 6, wherein the generated code comprises executable code for output by a compiler.

9. A computing system comprising a processor with access to a memory embodying program components, the program components comprising:
   a parser module that configures the computing system to access source code comprising declarative expressions and use a syntax of the expressions to generate output code, the output code comprising executable code or byte code,
   wherein the parser module configures the computing system to (i) identify a declarative expression of a dynamic structure in the source code and (ii) generate a mapping for use in generating output code, the dynamic structure declared as having at least one of a name referencing a dynamic value or at least one key-value pair referencing a dynamic value and the mapping comprising at least one intermediate expression corresponding to the dynamic value, and wherein the at least one intermediate expression comprises:
   a declaration to initialize an intermediate component of the mapping, the intermediate component of the mapping comprising at least one of an array or a variable; and
   a declaration to initialize a structure having an intermediate array name in place of an array declared in the dynamic structure; and
wherein generating output code comprises selecting code segments that cause a computing device to initialize a series of implicit nodes corresponding to the at least one intermediate expression and then assemble the nodes together into the dynamic structure at runtime.

10. The system set forth in claim 9, wherein generating the mapping comprises:
   determining that the name of the dynamic structure references an implicit element; and
   including an intermediate expression in the mapping, the intermediate expression comprising an expression to initialize a variable and an intermediate expression binding the value of the variable to the name of the dynamic structure as declared.

11. The system set forth in claim 9, wherein generating the mapping comprises:
   determining that at least one value in a key-value pair of the dynamic structure references an array, the array having at least one array value;
   including an intermediate expression in the mapping, the intermediate expression comprising a declaration to initialize the intermediate array having the intermediate array name and comprising the at least one array value.

12. The system set forth in claim 9, wherein generating the mapping comprises:
   determining that at least one key name in a key-value pair of the dynamic structure is a dynamic value;
   including an intermediate expression in the mapping, the intermediate expression comprising a declaration to initialize an intermediate variable having the key name as a value; and
   including an intermediate expression in the mapping comprising a declaration to initialize a structure having the intermediate variable in place of the at least one key name.

13. The system set forth in claim 9, wherein the parser module is included in at least one of a compiler or an application server.

14. A computer program product comprising a non-transitory computer readable medium embodying program code executable by a computing system, the program code comprising:
   program code for accessing source code from a computer-readable medium, the source code comprising at least one declarative expression;
   program code for identifying a declarative expression of a dynamic structure in source code by parsing the source code, the dynamic structure declared as having at least one of a name referencing a dynamic value or at least one key-value pair referencing a dynamic value;
   program code for generating a mapping for use in generating output code, the output code configured to generate a structure at runtime based on the declaration of the dynamic structure, wherein the mapping comprises at least one intermediate expression corresponding to the dynamic value, and wherein the at least one intermediate expression comprises:
      a declaration to initialize an intermediate component of the mapping, the intermediate component of the mapping comprising at least one of an array or a variable; and
      a declaration to initialize a structure having an intermediate array name in place of an array declared in the dynamic structure; and
   program code for storing the mapping in the non-transitory computer-readable medium.

15. The computer program product set forth in claim 14, wherein generating the mapping comprises:
   determining that the name of the dynamic structure references an implicit element; and
   including an intermediate expression in the mapping, the intermediate expression comprising an expression to initialize a variable and an intermediate expression binding the value of the variable to the name of the dynamic structure as declared.

16. The computer program product set forth in claim 14, wherein generating the mapping comprises:
   determining that at least one value in a key-value pair of the dynamic structure references an array, the array having at least one array value; and
   including an intermediate expression in the mapping, the intermediate expression comprising a declaration to initialize the intermediate array having the intermediate array name and comprising the at least one array value.

17. The computer program product set forth in claim 14, wherein generating the mapping comprises:
   determining that at least one key name in a key-value pair of the dynamic structure is a dynamic value;
   including an intermediate expression in the mapping, the intermediate expression comprising a declaration to initialize an intermediate variable having the key name as a value; and
   including an intermediate expression in the mapping comprising a declaration to initialize a structure having the intermediate variable in place of the at least one key name.

18. The computer program product set forth in claim 14, further comprising:
   program code for using the mapping to generate output code, the output code configured to cause a computing device to initialize a series of implicit nodes corresponding to the at least one intermediate expression and then assemble the nodes together into the dynamic structure at runtime.

19. The computer program product set forth in claim 18, wherein the source code comprises a code generation file and the generated code comprises byte code for use by an application server.

20. The computer program product set forth in claim 18, wherein the generated code comprises executable code for output by a compiler.

* * * * *

UNITED STATES PATENT AND TRADEMARK OFFICE
CERTIFICATE OF CORRECTION

| | | |
|---|---|---|
| PATENT NO. | : 8,621,447 B1 | Page 1 of 1 |
| APPLICATION NO. | : 12/546891 | |
| DATED | : December 31, 2013 | |
| INVENTOR(S) | : Kumar et al. | |

It is certified that error appears in the above-identified patent and that said Letters Patent is hereby corrected as shown below:

On the Title Page:

Insert the following paragraph:

Item --[65]    Prior Publication Data

US 2013/0346951 A1    Dec. 26, 2013--

Signed and Sealed this
Twenty-seventh Day of May, 2014

Michelle K. Lee
*Deputy Director of the United States Patent and Trademark Office*